United States Patent
Almazan et al.

(10) Patent No.: US 11,138,469 B2
(45) Date of Patent: Oct. 5, 2021

(54) TRAINING AND USING A CONVOLUTIONAL NEURAL NETWORK FOR PERSON RE-IDENTIFICATION

(71) Applicant: Naver Corporation, Seongnam-si (KR)

(72) Inventors: Jon Almazan, Grenoble (FR); Bojana Gajic, Barcelona (ES); Naila Murray, Grenoble (FR); Diane Larlus-Larrondo, La Tronche (FR)

(73) Assignee: Naver Corporation

( * ) Notice: Subject to any disclaimer, the term of this patent is extended or adjusted under 35 U.S.C. 154(b) by 71 days.

(21) Appl. No.: 16/675,298

(22) Filed: Nov. 6, 2019

(65) Prior Publication Data

US 2020/0226421 A1 Jul. 16, 2020

Related U.S. Application Data

(60) Provisional application No. 62/792,716, filed on Jan. 15, 2019.

(51) Int. Cl.
  *G06K 9/62* (2006.01)
  *G06N 3/08* (2006.01)
  *G06K 9/00* (2006.01)

(52) U.S. Cl.
  CPC ....... *G06K 9/6256* (2013.01); *G06K 9/00288* (2013.01); *G06K 9/00744* (2013.01); *G06N 3/08* (2013.01)

(58) Field of Classification Search
  CPC ............ G06K 9/6256; G06K 9/00744; G06K 9/00288; G06K 9/00711; G06K 9/00771; G06K 9/6271; G06K 9/00295; G06N 3/08; G06N 3/0481; G06N 3/0454
  USPC .......................................................... 382/159
  See application file for complete search history.

(56) References Cited

U.S. PATENT DOCUMENTS

| | | | | |
|---|---|---|---|---|
| 10,515,295 | B2 * | 12/2019 | Liu ..................... | G06K 9/3266 |
| 2018/0114055 | A1 * | 4/2018 | Wang .................. | G06K 9/4628 |
| 2020/0097742 | A1 * | 3/2020 | Ratnesh Kumar ... | G06N 3/0454 |
| 2020/0125897 | A1 * | 4/2020 | Wang ................. | G06K 9/00362 |

(Continued)

OTHER PUBLICATIONS

Chen, "Similarity Learning with Listwise Ranking for Person Re-Identification", IEEE Xplore | IEEE Conferences | Aug. 29, 2018 | 2018 25th IEEE International Conference on Image Processing (ICIP) (pp. 843-847). 2018.*

(Continued)

*Primary Examiner* — Juan A Torres

(57) ABSTRACT

A method for re-identification of a subject in an image by pre-training a convolutional neural network to recognize individuals within a closed set of possible identifications and further pre-training the convolutional neural network using classification loss; training the pre-trained convolutional neural network by sequentially processing a plurality of triplet of images, each triplet containing a query image degraded by adding random noise to a region of the query image, a positive image corresponding to an image of a same subject as in the query image, and a negative image corresponding to an image of a different subject as in the query image by (a) ranking the triplets by the triplet loss computed, (b) selecting a subset of triplets among the plurality of triplets, and (c) retraining the pre-trained convolutional neural network on each of the triplets of the subset of triplets.

18 Claims, 5 Drawing Sheets

(56) References Cited

U.S. PATENT DOCUMENTS

2020/0218888 A1* 7/2020 Gong .................... G06N 20/00
2020/0349348 A1* 11/2020 Zhou .................. G06K 9/00771

OTHER PUBLICATIONS

Khatun, "A Deep Four-Stream Siamese Convolutional Neural Network with Joint Verification and Identification Loss for Person Re-detection", arxiv.org | Dec. 21, 2018.*

Hermans, "In Defense of the Triplet Loss for Person Re-Identification", Mar. 22, 2017.*

Xiang, "Person Re-identification Based on Feature Fusion and Triplet Loss Function". IEEE Xplore | IEEE Conferences | Aug. 1, 2018 | 2018 24th International Conference on Pattern Recognition (ICPR) pp. 3477-3482. 2018.*

Supancic III, James Steven, and Deva Rarnanan. 'Self-Paced Learning for Long-Term Tracking'. In 2013 IEEE Conference on Computer Vision and Pattern Recognition, 2379-86. Portland, OR, USA: IEEE, 2013. https://doi.org/10.1109/CVPR.2013.308, 2013.

Szegedy, Christian, Vincent Vanhoucke, Sergey Ioffe, Jon Shiens, and Zbigniew Wojna. 'Rethinking the Inception Architecture for Computer Vision'. In 2016 IEEE Conference on Computer Vision and Pattern Recognition (CVPR), 2818-26. Las Vegas, NV, USA: IEEE, 2016, https://doi.org/10.1109/CVPR.2016.308, 2016.

Tolias, Giorgos, Ronan Sicre, and Hervé Jégou. 'Particular Object Retrieval with Integral Max-Pooling of CNN Activations'. ArXiv:1511.05879 [Cs], Feb. 24, 2016. http://arxiv.org/abs/1511.05879, 2016.

Varior, Rahul Rama, Mrinal Haloi, and Gang Wang. 'Gated Siamese Convolutional Neural Network Architecture for Human Re-Identification'. ArXiv:1607.08378 [Cs], Jul. 28, 2016. http://arxiv.org/abs/1607.08378, 2016.

Wang, Faqiang, Wangmeng Zuo, Liang Lin, David Zhang, and Lei Zhang. 'Joint Learning of Single-Image and Cross-Image Representations for Person Re-Identification'. In 2016 IEEE Conference on Computer Vision and Pattern Recognition (CVPR), 1288-96, 2016. https://doi.org/10.1109/CVPR.2016.144, 2016.

Wu, Chao-Yuan, R. Manmatha, Alexander J. Smola, and Philipp Krahenbuhl. 'Sampling Matters in Deep Embedding Learning'. In 2017 IEEE International Conference on Computer Vision (ICCV), 2859-67. Venice: IEEE, 2017. https://doi.org/10.1109/ICCV.2017.309, 2017.

Xiao, Tong, Shuang Li, Bochao Wang, Liang Lin, and Xiaogang Wang. 'Joint Detection and identification Feature Learning for Person Search'. In 2017 IEEE Conference on Computer Vision and Pattern Recognition (CVPR), 3376-85. Honolulu, HI: IEEE, 2017. https://doi.org/10.1109/CVPR.2017.360, 2017.

Xie, Saining, Ross Girshick, Piotr Dollar, Zhuowen Tu, and Kaiming He. 'Aggregated Residual Transformations for Deep Neural Networks'. In 2017 IEEE Conference on Computer Vision and Pattern Recognition (CVPR), 5987-95. Honolulu, HI: IEEE, 2017. https://doi.org/10.1109/CVPR.2017.634, 2017.

Xiong, Fei, Mengran Gou, Octavia Camps, and Mario Sznaier, Person Re-Identification Using Kernel-Based Metric Learning Methods, n.d., 2015.

Zhang, Dingwen, Deyu Meng, and Junwei Han. 'Co-Saliency Detection via a Self-Paced Multiple-Instance Learning Framework', IEEE Transactions on Pattern Analysis and Machine Intelligence 39, No. 5 (May 2017): 865-78. https://doi.org/10.1109/TPAMI.2016.2567393, 2016.

Zhang, Li, Tao Xiang, and Shaogang Gong. 'Learning a Discriminative Null Space for Person Re-Identification'. In 2016 IEEE Conference on Computer Vision and Pattern Recognition (CVPR), 1239-48. Las Vegas, NV, USA: IEEE, 2016, https://doi.org/10.1109/CVPR.2016,139, 2016.

Zhao, Haiyu, Maoqing Tian, Shuyang Sun, Jing Shao, Junjie Yan, Shuai Yi, Xiaogang Wang, and Xiaoou Tang. 'Spindle Net: Person Re-Identification with Human Body Region Guided Feature Decomposition and Fusion'. In 2017 IEEE Conference on Computer Vision and Pattern Recognition (CVPR), 907-15. Honolulu, HI: IEEE, 2017. https://doi.org/10.1109/CVPR.2017.103, 2017.

Zhao, Liming, Xi Li, Yueting Zhuang, and Jingdong Wang. 'Deeply-Learned Part-Aligned Representations for Person Re-Identification'. In 2017 IEEE International Conference on Computer Vision (ICCV), 3239-48. Venice: IEEE, 2017. https://doi.org/10.1109/ICCV.2017.349, 2017.

Zheng, Liang, Zhi Bie, Yifan Sun, Jingdong Wang, Chi Su, Shengjin Wang, and Qi Tian. 'MARS: A Video Benchmark for Large-Scale Person Re-Identification'. In Computer Vision—ECCV 2016, edited by Bastian Leibe, Jiri Matas, Nicu Sebe, and Max Welting, 9910:868-84. Cham: Springer International Publishing, 2016. https://doi.org/10.1007/978-3-319-46466-4_52, 2016.

Zheng, Liang, Liyue Shen, Lu Tian, Shengjin Wang, Jingdong Wang, and Qi Tian. 'Scalable Person Re-Identification: A Benchmark'. In 2015 IEEE International Conference on Computer Vision (ICCV), 1116-24. Santiago, Chile: IEEE, 2015, https://doi.org/10.1109/ICCV.2015.133, 2015.

Zheng, Zhedong, Liang Zheng, and Yi Yang. 'A Discriminatively Learned CNN Embedding for Person Re-Identification'. ACM Transactions on Multimedia Computing, Communications, and Applications 14, No. 1 (Dec. 13, 2017): 1-20. https://doi.org/10.1145/3159171, 2017.

Zheng, Zhedong, Liang Zheng, and Yi Yang. 'Unlabeled Samples Generated by GAN Improve the Person Re-Identification Baseline in Vitro'. In 2017 IEEE International Conference on Computer Vision (ICCV), 3774-82. Venice; IEEE, 2017. https://doi.org/10.1109/ICCV.2017.405, 2017.

Zhong, Zhun, Liang Zheng, Donglin Cao, and Shaozi Li. 'Re-Ranking Person Re-Identification with k-Reciprocal Encoding'. In 2017 IEEE Conference on Computer Vision and Pattern Recognition (CVPR), 3652-61, Honolulu, HI: IEEE, 2017. https://doi.org/10.1109/CVPR.2017.389, 2017.

Zhou, Jiahuan, Pei Yu, Wei Tang, and Ying Wu. 'Efficient Online Local Metric Adaptation via Negative Samples for Person Re-Identification', In 2017 IEEE International Conference on Computer Vision (ICCV). 2439-47. Venice: IEEE, 2017. https://doi.org/10.1109/ICCV.2017.265, 2017.

Zhou, Sanping, Jinjun Wang, Deyu Meng, Xiaomeng Xin, Yubing Li, Yihong Gong, and Nanning Zheng. 'Deep Self-Paced Learning for Person Re-Identification'. Pattern Recognition 76 (2017): 739-51. https://doi.org/10.1016/j.patcog.2017.10.005, 2017.

Zhou, Sanping, Jinjun Wang, Jiayun Wang, Yihong Gong, and Nanning Zheng. 'Point to Set Similarity Based Deep Feature Learning for Person Re-Identification'. In 2017 IEEE Conference on Computer Vision and Pattern Recognition (CVPR), 5028-37, 2017. https://doi.org/10.1109/CVPR.2017.534, 2017.

Zhu, Jianqing, Huanqiang Zeng, Shengcai Liao, Zhen Lei, Canhui Cai, and Lixin Zheng. 'Deep Hybrid Similarity Learning for Person Re-Identification'. IEEE Transactions on Circuits and Systems for Video Technology 28, No. 11 (Nov. 2018): 3183-93. https://doi.org/10.1109/TCSVT.2017.2734740, 2017.

Ahmed, Ejaz, Michael Jones, and Tim K. Marks. 'An Improved Deep Learning Architecture for Person Re-Identification'. In 2015 IEEE Conference on Computer Vision and Pattern Recognition (CVPR), 3908-16. Boston, MA, USA: IEEE, 2015. https://doi.org/10.1109/CVPR.2015.7299016, 2015.

Bai, Song, Xiang Bai, and Qi Tian. 'Scalable Person Re-Identification an Supervised Smoothed Manifold'. In 2017 IEEE Conference on Computer Vision and Pattern Recognition (CVPR), 3356-65. Honolulu, HI: IEEE, 2017. https://doi.org/10.1109/CVPR.2017.358, 2017.

Bedagkar-Gala, Apurva, and Shishir K Shah. 'A Survey of Approaches and Trends in Person Re-Identification'. Image and Vision Computing 32, No. 4 (Apr. 2014): 270-86. https://doi.org/10.1016/j.imavis.2014.02.001, Apr. 2014.

Bengio, Yoshua, Jérôme Louradour, Ronan Collobert, and Jason Weston. 'Curriculum Learning'. In Proceedings of the 26th Annual International Conference an Machine Learning—ICML '09, 1-8. Montreal, Quebec, Canada: ACM Press, 2009. https://doi,org/10.1145/1553374.1553380, 2009.

Cerf, Moran, Edward Paxon Frady, and Christof Koch. 'Faces and Text Attract Gaze Independent of the Task: Experimental Data and

(56) References Cited

OTHER PUBLICATIONS

Computer Model.' Journal of Vision 9, No. 12 (2009): 10.1-15. https://doi.org/10.1167/9.12.10, 2009.

Chen, Weihua, Xiaotang Chen, Jianguo Zhang, and Kaiqi Huang. 'Beyond Triplet Loss: A Deep Quadruplet Network for Person Re-identification'. In 2017 IEEE Conference on Computer Vision and Pattern Recognition (CVPR), 1320-29. Honolulu, HI: IEEE, 2017. https://doi.org/10.1109/CVPR.2017.145, 2017.

Chen, Yanbei, Xiatian Zhu, and Shaogang Gong. 'Person Re-Identification by Deep Learning Multi-Scale Representations'. In 2017 IEEE International Conference on Computer Vision Workshops (ICCVW), 2590-2600, 2017. https://doi.org/10.1109/ICCVW.2017.304, 2017.

Chen, Ying-Cong, Xiatian Zhu, Wei-Shi Zheng, and Jian-Huang Lai. 'Person Re-Identification by Camera Correlation Aware Feature Augmentation', IEEE Transactions on Pattern Analysis and Machine Intelligence 40, No. 2 (Feb. 2018): 392-408. https://doi.org/10.1109/TPAMI.2017.2666805, Feb. 2018.

Dai, Jifeng, Kaiming He, and Jian Sun. 'Instance-Aware Semantic Segmentation via Multi-Task Network Cascades'. In 2016 IEEE Conference on Computer Vision and Pattern Recognition (CVPR), 3150-58, Las Vegas, NV, USA: IEEE, 2016. https://doi.org/10.1109/CVPR.2016.343, 2016.

Deng, Jia, Wei Dong, Richard Socher, Li-Jia Li, Kai Li, and Li Fei-Fei. 'ImageNet: A Large-Scale Hierarchical Image Database'. In 2009 IEEE Conference on Computer Vision and Pattern Recognition, 248-55, 2009. https://doi.org/10.1109/CVPR.2009.5206848, 2009.

Ding, Shengyong, Liang Lin, Guangrun Wang, and Hongyang Chao. 'Deep Feature Learning with Relative Distance Comparison for Person Re-Identification'. ArXiv:1512.03622 [Cs], Dec. 11, 2015. http://arxiv.org/abs/1512.03622, Dec. 11, 2015.

Felzenszwalb, Pedro F, Ross B Girshick, David McAllester, and Deva Ramanan. 'Object Detection with Discriminatively Trained Part Based Models', n.d., 20, 2015.

Gordo, Albert, Jon Almazan, Jerome Revaud, and Diane Larlus, 'Deep Image Retrieval: Learning Global Representations for Image Search'. ArXiv:1604.01325 [Cs], Jul. 28, 2016. http://arxiv.org/abs/1604.01325, Jul. 2016.

Gordo, Albert, Jon Aimazan, Jerome Revaud, and Diane Larlus. 'End-to-End Learning of Deep Visual Representations for Image Retrieval'. ArXiv:1610.07940 [Cs], May 5, 2017. http://arxiv.org/abs/1610.07940, May 2017.

Gordo, Albert, and Diane Larlus. 'Beyond Instance-Level Image Retrieval: Leveraging Captions to Learn a Global Visual Representation for Semantic Retrieval'. In 2017 IEEE Conference on Computer Vision and Pattern Recognition (CVPR), 5272-81. Honolulu, HI: IEEE, 2017. https://doi.org/10.1109/CVPR.2017.560, 2017.

Harwood, Ben, Vijay Kumar B. G, Gustavo Carneiro, Ian Reid, and Tom Drummond. 'Smart Mining for Deep Metric Learning'. In 2017 IEEE International Conference on Computer Vision (ICCV), 2840-48. Venice: IEEE, 2017. https://doi.org/10.1109/ICCV.2017.307, 2017.

He, Kaiming, Xiangyu Zhang, Shaoqing Ren, and Jian Sun. 'Deep Residual Learning for Image Recognition'. In 2016 IEEE Conference on Computer Vision and Pattern Recognition (CVPR), 770-78. Las Vegas, NV, USA: IEEE, 2016. https://doi.org/10.1109/CVPR.2016.90, 2016.

Huang, Gao, Zhuang Liu, Laurens van der Maaten, and Kilian Q. Weinberger. 'Densely Connected Convolutional Networks'. In 2017 IEEE Conference on Computer Vision and Pattern Recognition (CVPR), 2261-69. Honolulu, HI: IEEE, 2017. https://doi.org/10.1109/CVPR.2017.243, 2017.

Jegou, Herve, Matthijs Douze, and Cordelia Schmid. 'On the Burstiness of Visual Elements'. In 2009 IEEE Conference on Computer Vision and Pattern Recognition, 1169-76, 2009. https://doi.org/10.1109/CVPR.2009.5206609, 2009.

Jiang, Lu, Deyu Meng, Shoou-I Yu, Zhenzhong Lan, Shiguang Shan, and Alexander Hauptmann. 'Self-Paced Learning with Diversity'. In Advances in Neural information Processing Systems 27, edited by Z. Ghahramani, M. Welling, C. Cortes, N. D. Lawrence, and K. Q. Weinberger, 2078-2086. Curran Associates, Inc., 2014. http://papers.nips.cc/paper/5568-self-paced-learning-with-diversity.pdf, 2014.

Khan, Faisal, Bilge Mutlu, and Jerry Zhu. 'How Do Humans Teach: On Curriculum Learning and Teaching Dimension'. In Advances in Neural Information Processing Systems 24, edited by J. Shawe-Taylor, R. S. Zemel, P. L. Bartlett, F. Pereira, and K. Q. Weinberger, 1449-1457, Curran Associates, Inc., 2011. http://papers.nips.cc/paper/4466-how-do-humans-teach-on-curriculum-learning-and-teaching-dimension.pdf, 2011.

Köstinger, Martin, Martin Hirzer, Paul Wohlhart, Peter M. Roth, and Horst Bischof. 'Large Scale Metric Learning from Equivalence Constraints'. In 2012 IEEE Conference on Computer Vision and Pattern Recognition, 2288-95, 2012. https://doi.org/10.1109/CVPR.2012.6247939, 2012.

Kumar, M. P., Benjamin Packer, and Daphne Koller, 'Self-Paced Learning for Latent Variable Models'. In Advances in Neural Information Processing Systems 23, edited by J. D. Lafferty, C. K. I. Williams. J. Shawe-Taylor, R. S. Zemel, and A. Culotta, 1189-1197, Curran Associates, Inc., 2010, 2010.

Lee, Yong Jae, and Kristen Grauman. 'Learning the Easy Things First: Self-Paced Visual Category Discovery'. In CVPR 2011, 1721-28. Colorado Springs, CO, USA: IEEE, 2011. https://doi.org/10.1109/CVPR.2011.5995523, 2011.

Li, Dangwei, Xiaotang Chen, Zhang Zhang, and Kaiqi Huang. 'Learning Deep Context-Aware Features over Body and Latent Parts for Person Re-Identification'. In 2017 IEEE Conference on Computer Vision and Pattern Recognition (CVPR), 7398-7407. Honolulu, HI: IEEE, 2017. hftps://doi.org/10.1109/CVPR.2017.782, 2017.

Li, Siyang, Xiangxin Zhu, Qin Huang, Hao Xu, and C.-C. Jay Kuo. 'Multiple Instance Curriculum Learning for Weakly Supervised Object Detection', ArXiv:1711.09191 [Cs], Nov. 25, 2017, http://arxiv.org/abs/1711.09191, 2017.

Li, Wei, Rui Zhao, Tong Xiao, and Xiaogang Wang. 'DeepReID: Deep Filter Pairing Neural Network for Person Re-Identification'. In 2014 IEEE Conference on Computer Vision and Pattern Recognition, 152-59. Columbus, OH, USA: IEEE, 2014. https://doi.org/10.1109/CVPR.2014.27, 2014.

Liao, Wentong, Michael Ying Yang, Ni Zhan, and Bodo Rosenhahn. 'Triplet-Based Deep Similarity Learning for Person Re-Identification'. In 2017 IEEE International Conference on Computer Vision Workshops (ICCVW), 385-93. Venice IEEE, 2017. https://doi.org/10.1109/ICCVW.2017.52, 2017.

Lin, Liang, Keze Wang, Deyu Meng, Wangmeng Zuo, and Lei Zhang. 'Active Self-Paced Learning for Cost-Effective and Progressive Face Identification'. IEEE Transactions on Pattern Analysis and Machine Intelligence 40, No. 1 (Jan. 2018): 7-19. https://doi.org/10.1109/TPAMI.2017.2652459, 2018.

Lin, Weiyao, Yang Shen, Junchi Yan, Mingliang Xu, Jianxin Wu, Jingdong Wang, and Ke Lu. 'Learning Correspondence Structures for Person Re-Identification', IEEE Transactions on Image Processing 26, No. 5 (May 2017): 2438-53. https://doi.org/10.1109/TIP.2017.2683063, 2017.

Liu, Hao, Jiashi Peng, Zegun Jie, Karlekar Jayashree, Bo Zhao, Meibin Qi, Jianguo Jiang, and Shuicheng Yan. 'Neural Person Search Machines'. In 2017 IEEE International Conference on Computer Vision (ICCV), 493-501. Venice: IEEE, 2017. https://doi.org/10.1109/ICCV.2017.61, 2017.

Liu, Hao, Jiashi Feng, Meibin Qi, Jiangua Jiang, and Shuicheng Yan. 'End-to-End Comparative Attention Networks for Person Re-Identification'. IEEE Transactions on Image Processing 26, No. 7 (Jul. 2017); 3492-3506. https://doi.org/10,1109/TIP.2017.2700762, 2017.

Liu, Xihui, Haiyu Zhao, Maoqing Tian, Lu Sheng, Jing Shao, Shuai Yi, Junjie Yan, and Xiaogang Wang. 'HydraPlus-Net: Attentive Deep Features for Pedestrian Analysis'. In 2017 IEEE International Conference on Computer Vision (ICCV), 350-59. Venice: IEEE, 2017. https://doi.org/10.1109/ICCV.2017.46, 2017.

Liu, Ziwei, Ping Luo, Shi Qiu, Xiaogang Wang, and Xiaoou Tang. 'DeepFashion: Powering Robust Clothes Recognition and Retrieval with Rich Annotations'. In 2016 IEEE Conference on Computer

(56) References Cited

OTHER PUBLICATIONS

Vision and Pattern Recognition (CVPR), 1096-1104, Las Vegas, NV, USA: IEEE, 2016, https://doi.org/10.1109/CVPR.2016.124, 2016.

Mignon, Alexis, and Frédéric Jurie. 'PCCA: A New Approach for Distance Learning from Sparse Pairwise Constraints'. In 2012 IEEE Conference on Computer Vision and Pattern, Recognition, 2666-72, 2012. https://doi.org/10.1109/CVPR.2012.6247987, 2012.

Paisitkriangkrai, Sakrapee, Chunhua Shen, and Anton van den Hengel. 'Learning to Rank in Person Re-Identification with Metric Ensembles'. In 2015 IEEE Conference on Computer Vision and Pattern Recognition (CVPR), 1846-55. Boston, MA, USA: IEEE, 2015. https://doi.org/10.1109/CVPR.2015.7298794, 2015.

Pedagadi, Sateesh, James Orwell, Sergio Velastin, and Boghos Boghossian. 'Local Fisher Discriminant Analysis for Pedestrian Re-Identification'. In 2013 IEEE Conference on Computer Vision and Pattern Recognition, 3318-25, 2013. https://doi.org/10.1109/CVPR.2013.426, 2013.

Pentina, Anastasia, Viktoriia Sharmanska, and Christoph H. Lampert. 'Curriculum Learning of Multiple Tasks'. In 2015 IEEE Conference on Computer Vision and Pattern Recognition (CVPR), 5492-5500. Boston, MA, USA: IEEE, 2015. https://doi.org/10.1109/CVPR.2015.7299188, 2015.

Qian, Xuelin, Yanwei Fu, Yu-Gang Jiang, Tao Xiang, and Xiangyang Xue. 'Multi-Scale Deep Learning Architectures for Person Re-Identification', In 2017 IEEE International Conference on Computer Vision (ICCV), 5409-18. Venice: IEEE, 2017. https://doi.org/10.1109/ICCV.2017.577, 2017.

Radenović, Filip, Giorgos Tolias, and Ondřej Churn. 'CNN Image Retrieval Learns from BoW: Unsupervised Fine-Tuning with Hard Examples'. In Computer Vision ECCV 2016, edited by Bastian Leibe, Jul Matas, Nicu Sebe, and Max Welling, 9905:3-20. Cham: Springer International Publishing, 2016. https://doi.org/10.1007/978-3-319-46448-0_1, 2016.

Rahman, Tanzila, Mrigank Rochan, and Yang Wang. 'Person Re-Identification by Localizing Discriminative Regions'. In Procedings of the British Machine Vision Conference 2017, 55. London, UK: British Machine Vision Association, 2017. https://doi.org/10.5244/C.31.55, 2017.

Ren, Shaoqing, Kaiming He, Ross Girshick, and Jian Sun. 'Faster R-CNN: Towards Real-Time Object Detection with Region Proposal Networks'. In Advances in Neural Information Processing Systems 28, edited by C. Cortes, N. D. Lawrence, D. D. Lee, M. Sugiyama, and R. Garnett, 91-99. Curran Associates, Inc., 2015. http://papers.nips.cc/paper/5638-faster-r-cnn-towards-real-time-object-detection-with-region-proposal-networks.pdf, 2015.

Rstani, Ergys, Francesco Solera, Roger Zou. Rita Cucchiara, and Carlo Tomasi. 'Performance Measures and a Data Set for Multi-Target, Multi-Camera Tracking'. In Computer Vision—ECCV 2016 Workshops, edited by Gang Hua and Hervé Jégou 9914:17-35. Cham: Springer International Publishing, 2018. https://doi.org/10.1007/978-3-319-46881-3_2, 2016.

Schroff, Florian, Dmitry Kalenichenko, and James Philbin, 'FaceNet: A Unified Embedding for Face Recognition and Clustering'. In 2015 IEEE Conference on Computer Vision and Pattern Recognition (CVPR), 815-23. Boston, MA, USA: IEEE, 2015. https://doi.org/10.1109/CVPR.2015.7298682, 2015.

Selvaraiu, Rampreseath R., Michael Cogswell, Abhishek Das, Ramakrishna Vedantam, Devi Parikh, and Dhruv Beira. 'Grad-CAM: Visual Explanations from Deep Networks via Gradient-Based Localization'. In 2017 IEEE International Conference on Computer Vision (ICCV), 618-26. Venice: IEEE, 2017, https://doi.org/10.1109/ICCV.2017.74, 2017.

Simonyan, Karen, and Andrew Zisserman. 'Very Deep Convolutional Networks for Large-Scale Image Recognition'. ArXiv:1409.1556 [Cs], Apr. 10, 2015, http://arxiv.org/abs/1409.1556, 2015.

Su, Chi, Jianing Li, Shiliang Zhang, Junliang Xing, Wen Gao, and Qi Tian. 'Pose-Driven Deep Convolutional Model for Person Re-Identification'. In 2017 IEEE International Conference on Computer Vision (ICCV), 3980-89. Venice: IEEE, 2017. https://doi.org/10.1109/ICCV.2017.427, 2017.

Su, Chi, Shiliang Zhang, Junliang Xing, Wen Gao, and Qi Tian. 'Deep Attributes Driven Multi-Camera Person Re-Identification', ArXiv:1605,03259 [Cs] 9906 (2016):475-91, https://doi.org/10.1007/978-3-319-46475-6_30, 2016.

Sun, Yifan, Liang Zheng, Weijian Deng, and Shengjin Wang. 'SVDNet for Pedestrian Retrieval'. In 2017 IEEE International Conference on Computer Vision (ICCV), 3820-28, Venice: IEEE, 2017, https://doi.org/10.1109/ICCV.2017.410, 2017.

* cited by examiner

| | Arch | Market SQ | | Market MQ | | MARS | | Duke-reID | | PS |
|---|---|---|---|---|---|---|---|---|---|---|
| | | mAP | rank1 | mAP | rank1 | mAP | rank1 | mAP | rank1 | mAP |
| MG [26] | X | 39.6 | 65.9 | 46.4 | 76.0 | - | - | - | - | - |
| CRAFT [67] | A | 45.5 | 71.8 | 54.3 | 79.7 | - | - | - | - | - |
| SpindleNet [11] | X | - | 76.9 | - | - | - | - | - | - | - |
| Zheng et al. [64] | C | 63.4 | 81.0 | - | - | 49.3 | 68.3 | - | - | - |
| Part-Aligned [29] | G | - | 80.7 | - | - | - | - | - | - | - |
| OL-MANS [21] | - | - | 76.9 | - | 66.8 | - | - | - | - | - |
| HydraPlus [31] | D | - | 80.3 | - | - | - | - | - | - | - |
| MSCAN [34] | X | 57.5 | 82.1 | 66.7 | 86.8 | 60.4 | 83.0 | - | 68.1 | 77.9 |
| OIM [66] | - | 63.4 | 84.1 | - | - | - | - | 49.3 | 68.9 | - |
| PDC [10] | G | 63.4 | 84.1 | - | 85.8 | - | - | - | - | - |
| Verif.Identif. [68] | R50 | 59.9 | 79.5 | 70.3 | 85.8 | - | - | 49.3 | 68.9 | - |
| LSRO [35] | R50 | 66.1 | 84.0 | 76.1 | 88.4 | - | - | 47.1 | 67.7 | - |
| SVDNet [22] | R50 | 62.1 | 82.3 | - | - | - | - | 56.8 | 76.7 | - |
| SSM [25] | - | 68.8 | 82.2 | 76.2 | 88.2 | - | - | - | - | - |
| DSPL [48] | X | 46.7 | 72.9 | 57.4 | 87.0 | - | - | - | - | - |
| DPFL [19] | I3 | 73.1 | 88.9 | - | - | - | - | 60.6 | 79.2 | - |
| Ours | R50 | 70.3 | 86.6 | 83.7 | 93.5 | 77.2 | 83.9 | 67.6 | 82.6 | - |
| Ours | R101 | 81.2 | 92.2 | 87.3 | 94.7 | 79.7 | 85.9 | 72.8 | 85.2 | 82.0 |
| Re-ranking [36] | R50 | 63.6 | 77.1 | - | - | 68.4 | 73.9 | - | - | - |
| Ours (re-rank) | R101 | 86.0 | 90.0 | 91.2 | 94.2 | 85.7 | 87.2 | 85.6 | 89.4 | - |

FIGURE 5

TRAINING AND USING A CONVOLUTIONAL NEURAL NETWORK FOR PERSON RE-IDENTIFICATION

PRIORITY INFORMATION

The present application claims priority, under 35 USC § 119(e), from U.S. Provisional Patent Application, Ser. No. 62/792,716, filed on Jan. 15, 2019. The entire content of U.S. Provisional Patent Application, Ser. No. 62/792,716, filed on Jan. 15, 2019, is hereby incorporated by reference.

BACKGROUND

Embodiments are generally related to the field of machine learning, and more precisely to a method for training a convolutional neural network for person re-identification, and to a method for using such trained convolutional neural network for person re-identification.

Person re-identification is the task of correctly identifying the images in a database that contain the same person as a query image. It is highly relevant to applications where the same person may have been captured by different cameras, for example in surveillance camera networks or for content-based image or video retrieval.

Most works that address this problem have sought to improve either the image representation, often by carefully hand-crafting its architecture, or the image similarity metric. Following the great success of deep networks on a wide variety of computer vision tasks, including image classification, object detection, and semantic segmentation, a dominant paradigm in person re-identification has emerged, where methods use or fine-tune successful deep architectures for the re-identification task.

Person re-identification is challenging for several reasons. First, one typically assumes that the individuals to be re-identified at testing time were never seen during the model's training phase. Second, the problem is large-scale in the sense that at testing time one may need to re-identify thousands of individuals. An additional challenge is that images of the same person have often been captured under different conditions (including lighting, resolution, scale and perspective), by the different cameras.

In particular, the pose of the person may be vastly different between different views. For example, one may need to match a frontal view of a person walking to a profile view of the same person after they have mounted a bicycle.

Lastly, most re-identification systems rely on a pre-processing stage where a person detection algorithm is applied to images in order to localize individuals. As such, they must be robust to detection errors leading to truncated persons or poor alignment.

Traditionally works on person re-identification sought to improve similarity scores between images through metric learning. These methods typically used color-based histograms as input feature vectors due to their discriminative power particularly with respect to clothing, and also to their small memory footprint.

Recent works in the literature often introduce additional modules to their deep networks to address the aforementioned challenges of scale and pose variations, and detection errors. Some of these additional modules explicitly align body parts between images, for example by using pre-trained pose estimators or human joint detectors. Others add attentional modules or scale fusion. Some use additional annotations such as attributes.

Likewise, more recently, research on person re-identification has shifted towards end-to-end training of deep architectures. This research has taken two main directions: improving generic deep image representations using sophisticated learning objectives appropriate for person re-identification, or designing task-specific image representations.

The first line of research most often involves proposing loss functions suitable for the re-identification task, and in particular, for learning effective similarity metrics. For example, one method learns similarities between an image and a set of images, as opposed to learning similarities between images pairs.

One method proposes to modify a global similarity metric, which was trained offline, in an online manner at test time using only negative examples. Another method adds an orthogonality constraint to the final fully-connected layer of a deep network in order to improve the discriminability of the learned features.

An additional method proposes to train a re-identification model using as a similarity metric a hybrid of the Euclidean, Cosine and Mahalanobis distances. A fourth method learns a suitable embedding space. A fifth method proposes to modify image embeddings such that the learned similarity metric between images is smooth in the underlying image manifold.

Some recent works have addressed re-identification by applying models that were trained for a classification task using e.g. a cross-entropy loss. Others treat person re-identification, not as a recognition, but rather as a ranking problem, and use losses that are more appropriate for ranking.

For example, contrastive loss and triplet loss or variants thereof have been used to train Siamese architectures. Moreover, a scheme to limit the size of triplet batches while still obtaining informative samples has been used for re-identification. A quadruplet loss, which adds a term that enforces a margin constraint on the distance between image pairs that are unrelated, has also been utilized.

Another line of research focuses on designing task-specific image representations. Many works have focused on addressing the alignment problem via use of e.g. part detectors, pose estimation, or attention models. Spatial transformer networks have been used to localize salient image regions for finding correspondences.

In a similar vein, another approach trained multiple parallel sub-branches of a deep network to attend to different human body parts.

Other examples of conventional re-identification use different approaches such as: using a pre-trained pose estimation network to provide explicit part localization; integrating a pose estimation network into their deep re-identification model; rather than localizing parts, representing images with fixed grids and learns cell correspondences across camera views; using multi-scale architectures with mechanisms for automatic scale selection; using scale fusion; or combining a multi-scale architecture with unsupervised body part localization using spatial transformer networks.

Some approaches for re-identification have taken other directions, such as: explicitly tackling data scarcity or exploring re-ranking; using generative adversarial networks to synthesize crops of pedestrians which are used to train a deep re-identification network in a semi-supervised manner; applying k-reciprocal nearest neighbor re-ranking to the re-identification problem; and tackling end-to-end re-identification by incorporating person detection into the pipelines.

Another approach shows positive experimental evidence that machine learning algorithms can benefit from a curriculum strategy, wherein the knowledge to be acquired does not come in a random order, but is organized meaningfully with gradually more, or more complex concepts. On a set of tasks, they show that guiding the difficulty level of the training samples during optimization leads to faster convergence and better solutions. Similarly, the concept of self-paced learning, which automatically chooses the order in which training samples are processed for solving a non-convex learning problem, has been used.

A standard interpretation of a curriculum is to define an order in which the training samples are to be presented to the learning algorithm, typically from the easiest to the most difficult ones. Most previous works on curriculum learning or self-paced learning consider only this interpretation of a curriculum, and propose methods to rank samples based either on predetermined heuristics or on weights produced by the model.

Another angle, explored for instance in multi-task learning, is to order tasks such that knowledge is more effectively transferred between closely-related tasks, making them easier to learn. Processing multiple tasks in a sequence and exploring the curriculum learning of tasks; i.e., finding the best order in which the tasks should be learned; has been utilized.

The various approaches, discussed above, are difficult in certain contexts and implement complex and overly cumbersome models of person re-identification.

Accordingly, it is desirable to implement person re-identification using a convolutional neural network which outperforms conventional techniques while being less complex.

It is desirable to design a method for training a convolutional neural network for person re-identification that includes: taking a plurality of triplet of images, wherein where each triplet contains a query image Iq, a positive image I+ corresponding to an image of a same subject as in the query image, and a negative image I− corresponding to an image of a different subject as in the query image; computing the triplet loss for each triplet; ranking the triplets by the triplet loss computed; selecting a subset of triplets among the plurality of triplets, the subset of triplets having the largest computed loss among the plurality of triplets; and retraining the convolutional neural network on each of the triplets of the subset of triplets to determine trained values of a plurality of parameters of the neural network.

It is also desirable to improve the model convergence and performance of a convolutional neural network model trained for person re-identification by continually modulating the difficulty of the task to be learned throughout the model's training phase.

Moreover, it is desirable to implement person re-identification using a convolutional neural network, which results in a compact but powerful architecture, that produces global image representations that outperform state-of-the-art person re-identification methods, including more sophisticated methods that rely on extra annotations or explicit alignment.

BRIEF DESCRIPTION OF THE DRAWINGS

The drawings are only for purposes of illustrating various embodiments and are not to be construed as limiting, wherein:

FIGS. 4 and 5 illustrate the performance of the methods.

DETAILED DESCRIPTION

According to two complementary aspects of the embodiments, a method for training a convolutional neural network for person re-identification and a method for matching a person in an image among a plurality of images using a trained convolutional neural network are disclosed below.

Figure 1:
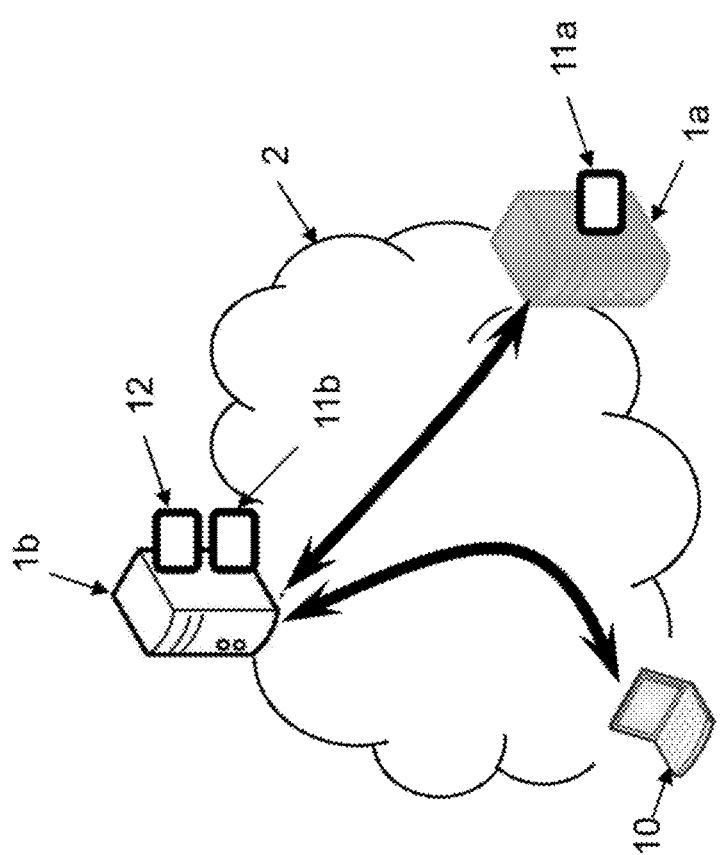
FIG. 1 illustrates an example of architecture for a method of training and a method of re-identification.

The above mentioned two types of methods are implemented within an architecture such as illustrated in FIG. 1, by means of a first and/or second server 1a, 1b. The first server 1a is the learning server (implementing the first method) and the second server 1b is a person re-identification server (implementing the second method). It is fully possible that these two servers may be merged.

Each of these servers 1a, 1b is typically remote computer equipment connected to an extended network 2 such as the Internet for data exchange. Each server 1a, 1b comprises data processing means 11a, 11b and optionally storage means 12 such as a computer memory; e.g., a hard disk.

The memory 12 of the first server 1a stores a training database; i.e., a set of already identified data (as opposed to so-called inputted data that precisely is sought to be identified).

The architecture comprises one or more items of client equipment 10, which may be any workstation (also connected to network 2), preferably separate from the servers 1a, 1b but possibly being merged with one and/or the other thereof. The client equipment 10 has one or more data items to be identified. The operators of the equipment are typically "clients" in the commercial meaning of the term, of the service provider operating the first and/or second servers 1a, 1b.

Initially, a training method, implemented by the data processing means 11a of the first server 1a, is executed. The method trains a convolutional neural network for person re-identification in a set of images.

Figure 2:
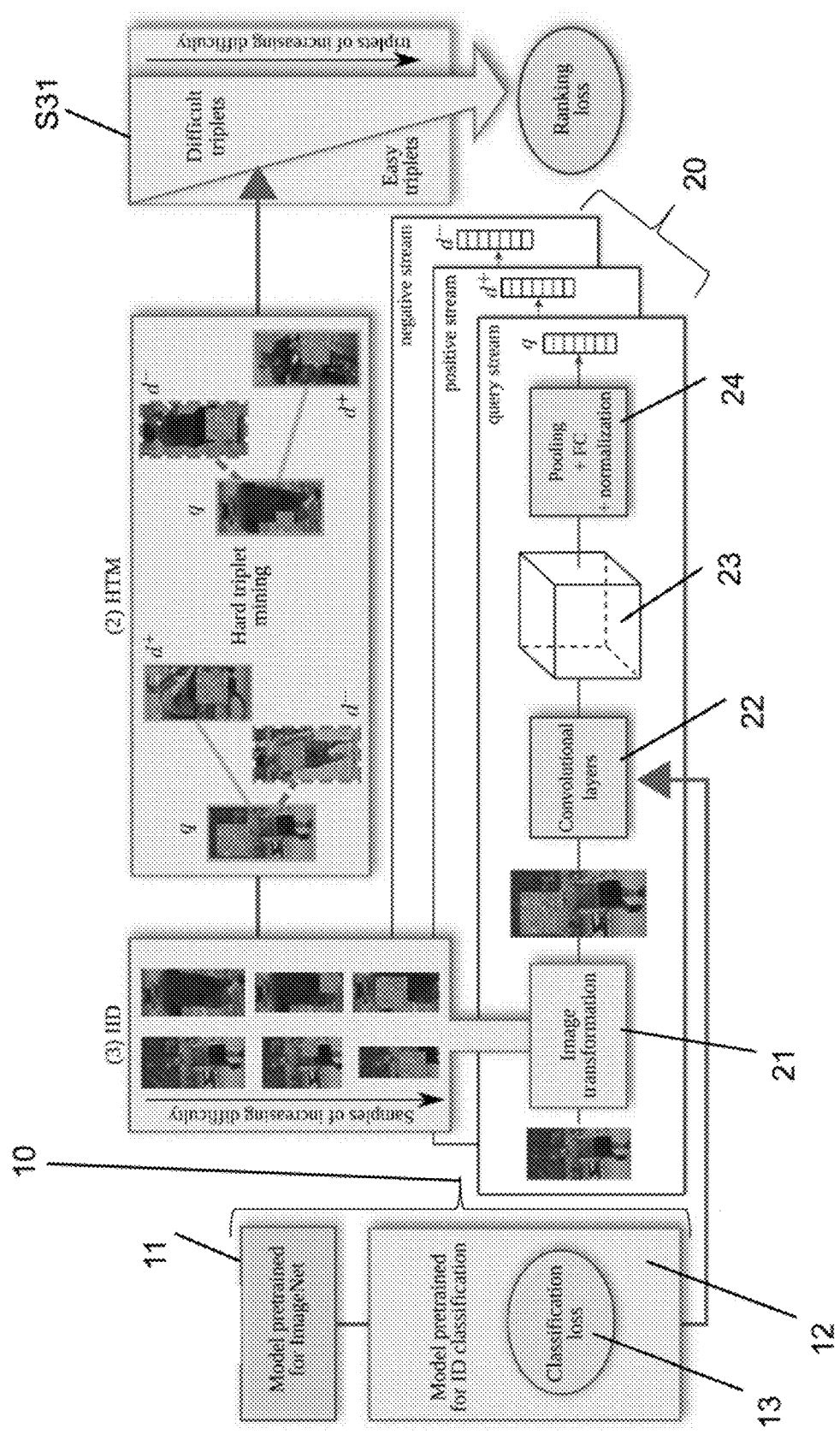
FIG. 2 represents an embodiment of training a convolutional neural network architecture.
Figure 3:
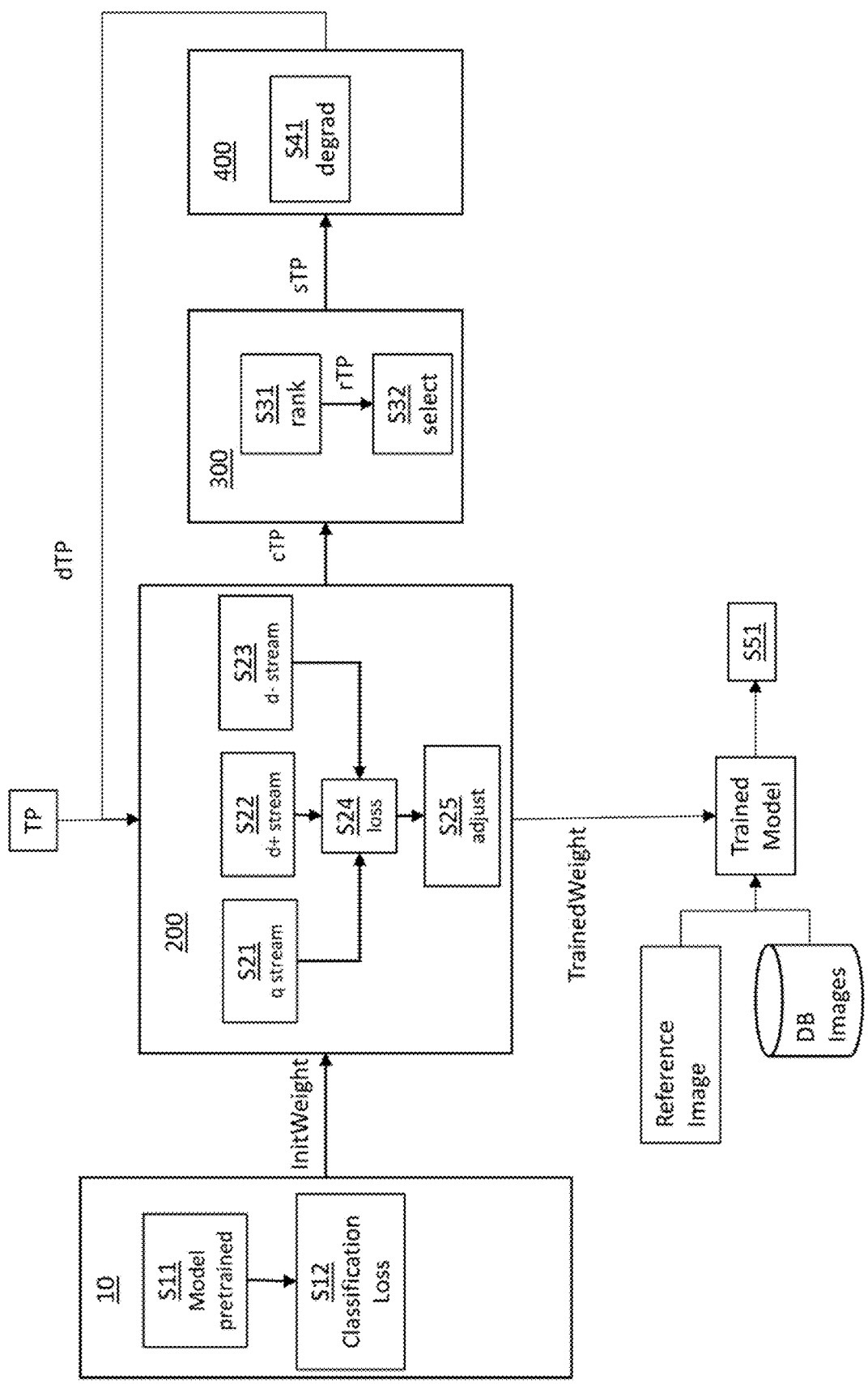
FIG. 3 represents an embodiment of a training method and a re-identification method.

As illustrated in FIGS. 2 and 3, the training method comprises a pre-training classification strategy in which a model is trained to learn the task of person identification classification (which requires the model to first recognize individuals within a closed set of possible identities) before training it for the more challenging task of re-identifying persons unseen during training.

In model processing (11 of FIG. 2) pre-training classification (10 of FIGS. 2 and 3), the training method obtains a model S11. By example, the model is a known model S11 such as one pre-trained on ImageNet.

The model contains a backbone convolutional network, pre-trained for image classification (12 of FIG. 2), which is used to extract local activation features from input images of an arbitrary size and aspect ratio. Different backbone convolutional neural networks, such as VGG, ResNet, ResNeXt, Inception, and Densenet can be used interchangeably in the architecture of the training method.

The local activation features are then max-pooled into a single vector, fed to a fully-connected layer and L2-normalized, producing a compact vector; i.e., an image representation, whose dimension is independent of the image size.

It is noted that the aspect ratio of the training images is not modified, either at training or testing time, which is beneficial for image retrieval tasks.

Then, the training method comprises an additional pre-training process (13 of FIG. 2) of fine-tuning the model on the training set of each re-identification dataset using a classification loss (S12 of FIG. 3). That is, the model is trained for person re-identification.

The weights obtained by this pre-trained network for the convolutional layers (22 of FIG. 2) are then used to initialize the weights of a re-identification neural network architecture (20 of FIGS. 2 and 3) detailed below.

In an embodiment, the re-identification neural network (20 of FIGS. 2 and 3) has a three-stream Siamese architecture at training time.

A Siamese neural network is a class of neural network architectures that contain two or more identical subnetworks—identical here means the networks have the same configuration with the same parameters and with shared weights.

Siamese neural networks are particularly adapted for tasks that involve finding similarities or a relationship between two comparable things.

To train the representation end-to-end, a three-stream Siamese architecture in which the weights are shared between all streams is used.

Since the weights of the convolutional layers (22 of FIG. 2) and the fully-connected layer are independent of the size of the input image, the Siamese architecture (20 of FIGS. 2 and 3) can process images of any size and aspect ratio.

Each stream encompasses an image transformation (21 of FIG. 2); convolutional layers (22 of FIG. 2) which process blocks of the image one after the other; rectified unit layers (23 of FIG. 2), which is a type of activation function; and pooling layers which allow the grouping together of several neuron activations in one single activation, a fully connected layer that connects all the neurons of a layer with all the neurons of the preceding layer, and batch normalization layers to accelerate learning (24 of FIG. 2).

The convolution layer (22 of FIG. 2), and the fully connected layer (24 of FIG. 2), generally correspond to a scalar product between the response of the neurons of the preceding layer and the weights of the neurons of the current layer.

The number of layers, configuration, and arrangement depend on the specific backbone architecture.

In a training process (200 of FIG. 3), the three-stream architecture (20 of FIG. 2) takes image triplets as input (TP), where each triplet contains a query image Iq, a positive image I+ (i.e. an image of the same person as in the query image), and a negative image I− (i.e. an image of a different person).

Each stream produces a compact representation for each image in the triplet, leading to the descriptors q, d+, and d−, respectively (S21, S22, and S23 of FIG. 3).

The network is trained by taking a query image and comparing it with both a positive sample and a negative sample. The dissimilarity between the query image and positive image must be low and the dissimilarity between the query image and the negative image must be high.

To achieve this, the training method computes a triplet loss from the representation of the query image, the positive image, and the negative image (S24 of FIG. 3). Generally, the triplet loss depends on the distance between the numeric embedding of the query image and the numeric embedding of the positive image and on the distance between the numeric embedding of the query image and the numeric embedding of the negative image.

The triplet loss L can be defined by the following formula:

$$L(I_q, I^+, I^-) = \max(0, m + q^T d^- - q^T d^+)$$

wherein m is a scalar that controls the margin. This loss ensures that the embedding of the positive image q is closer to the query image embedding d+ than that of the negative image d−, by at least a margin m.

Also, images are upscaled to increase the input image size, and are not distorted.

To this end, the triplets are processed sequentially, allowing a different input size for each image and allowing the use of high-resolution images even in the most memory hungry architectures (e.g. ResNet-152 or Densenet).

To account for the reduced batch size, the gradients of the loss are accumulated with respect to the parameters of the network for every triplet, and the network is only updated once the desired effective batch size is achieved.

It is noted that all the operations of the model are differentiable. Therefore, all the network weights (i.e. from both convolutional and fully-connected layers) can be learned in an end-to-end manner.

The training method adjusts the current values of the parameters of the neural network using the triplet loss (S25 of FIG. 3) to minimize the triplet loss. The training method can adjust the current values of the parameters of the neural network using conventional neural network training techniques, e.g., stochastic gradient descent with backpropagation.

The computed triplet losses (cTp), obtained in the training process (200 of FIG. 3), are ranked (rTP) (S31 of FIG. 3) following a hard-negative mining strategy that samples triplets of increasing difficulty as learning continues.

To evaluate the difficulty of a triplet, the similarity between the query image in the triplet and the relevant image is compared to the similarity between the query image and the non-relevant image.

To select triplets (S32 of FIG. 3), an image is randomly selected as a query and a set of triplets is randomly picked from a pool of triplets with large losses for that query.

In an embodiment, to accelerate the process, a new set of random triplets is only extracted after the model has been updated k times with the desired batch size b.

The hard triplet mining (300 of FIG. 3) improves model convergence and accuracy.

It is noted that hard triplet mining (300 of FIG. 3) is done before the back propagation. The hard triplet mining (300 of FIG. 3) is used to determine which triplets to use for back propagation. In other words, computing the triplets, and then ranking the triplets, precedes re-adjusting the parameters/weights using back propagation.

The selected triplets (sTP) obtained are then used to generate training samples of increasing difficulty (400 of FIG. 3).

The training method (S41 of FIG. 3) progressively increases the difficulty of the training images themselves. By difficulty, it means that the appearance of regions of the image is degraded to obtain degraded samples (dTP).

By example, the training method can implement an image "cut-out" strategy, which consists of adding random noise to random-sized regions of the image. This also acts as a form of data augmentation.

The training method uses the selected triplets to train again the model (200 of FIG. 3). The maximum size of these regions is progressively increased during training, thus progressively producing more difficult examples (dTP).

The data augmentation directly targets robustness to occlusion, and the data augmentation allows for model regularization by acting as a "drop-out" mechanism at the image level. As a result, data augmentation avoids the over-fitting inherent to the small size of the training sets and significantly improves the results.

In one embodiment, the network is trained, using the Siamese architecture, with input images of variable size while fixing the largest dimension to 416 pixels, which experimentally proved to be a good trade-off between efficiency and performance. Stochastic gradient descent is used with a batch size of 64 and an initial learning rate of 10-3, which is decreased using a logarithmic rate that halves the learning rate every 512 iterations. This embodiment converges after approximately 4,096 iterations. For hard triplet mining, the number of random examples is set to N=5,000 and the number of updates to k=16. The margin of the loss is set to m=0.1.

For person re-identification, an inputted person re-identification method implemented by the data processing means 11b of the second server 1b. In other words, the method allows person re-identification in images given a reference image. The reference image can be received from the client equipment 10.

Initially, the training of a convolutional neural network is performed by the first server 1a from a base of training images. Preferably, the training is consistent with the method described above, wherein a trained convolutional neural network is obtained.

It is noted that first and second servers 1a, 1b may be the same equipment, or the trained convolutional neural network parameters and weights are transmitted from the first server 1a to the second server 1b, for storage in the memory 12.

The data processing means 11b of the second server 1b re-identifies a subject of an inputted image, with the trained convolutional neural network, in a database of images. The obtained re-identification result can be transmitted back to the client equipment 10. The data processing means 11b of the second server 1b re-identifies a subject of an inputted image, with the trained convolutional neural network, in a database of images. The obtained re-identification result (S51 of FIG. 3) can be transmitted back to the client equipment 10.

The training method can be evaluated considering four datasets.

One dataset is the Market-1501 dataset, which is a standard person re-identification benchmark with images from six cameras of different resolutions. Deformable Part Model detections were annotated as containing one of the 1,501 identities, among which 751 are used for training and 750 for testing. The training set contains 12,936 images with 3,368 query images. The gallery set is composed of images from the 750 test identities and of distractor images, 19,732 images in total. There are two possible evaluation scenarios for this database, one using a single query image and one with multiple query images.

Another dataset is the MARS dataset, which is an extension of the Market dataset that targets the retrieval of gallery tracklets (i.e. sequences of images) rather than individual images. The MARS dataset contains 1,261 identities, divided into a training (631 Identifications) and a test (630 Identifications) set. The total number of images is 1,067,516, among which 518,000 are used for training and the remainder for testing.

A third dataset is the DukeMTMC-reID dataset, which was created by manually annotating pedestrian bounding boxes every 120 frames of the videos from 8 cameras of the original DukeMTMC dataset. The DukeMTMC-reID dataset contains 16,522 images of 702 identities in the training set, and 702 identities, 2,228 query and 17,661 gallery images in the test set.

The fourth dataset is the Person Search dataset, which differs from the previous three, as the Person Search dataset was created from images collected by hand-held cameras and frames from movies and TV dramas. It can, therefore, be used to evaluate person re-identification in a setting that does not involve a known camera network. The Person Search dataset contains 18,184 images of 8,432 identities, among which 5,532 identities and 11,206 images are used for training, and 2,900 identities and 6,978 images are used for testing.

The table below represents an evaluation of the training method, and particularly how the different steps (Pre-training for Classification (PFC), Increasing Image Difficulty (IID), and Hard Triplet Mining (HTM)) implemented contribute to the final results.

TABLE 1

| PFC | IID | HTM | Market | | Duke | |
|-----|-----|-----|--------|------|------|------|
| /   | /   | /   | 81.2   |      | 72.9 |      |
|     | /   | /   | 77.1   | (−4.1) | 71.1 | (−1.8) |
| /   |     | /   | 75.9   | (−5.3) | 69.6 | (−3.3) |
| /   | /   |     | 75.6   | (−5.6) | 68.3 | (−4.3) |

This table reports mean average precision (mAP) on Market and Duke, using ResNet-101 as backbone architecture.

The table shows that each strategy has a significant impact on the performance, ranging between 4-6% mAP for Market, and 2-3% for Duke.

In particular, for Market, removing the Pre-training for Classification step has a significant negative impact on the performance (4.1% of mAP), showing that training the model on tasks of increasing difficulty is highly beneficial.

Removing the Increasing Image Difficulty strategy decreases performance by 5.3%. Increasing Image Difficulty has a strong impact because it makes the representation more robust to occlusion and also because it acts as a data augmentation strategy, thereby avoiding over-fitting on such little training data.

Removing Hard Triplet Mining and instead choosing triplets at random decreases the performance by 5.6% mAP.

It is noted that Increasing Image Difficulty not only complements but also reinforces Hard Triplet Mining. Increasing Image Difficulty produces images that are more difficult to re-identify by introducing random noise. These images produce harder triplets, which boosts the effect of Hard Triplet Mining. Increasing Image Difficulty and Hard Triplet Mining both have an impact of more than 5% of mAP (third and fourth row versus first row in Table 1).

An additional model trained using neither Increasing Image Difficulty nor Hard Triplet Mining shows a very large performance drop (−11%), confirming that the generation of more and more difficult examples is highly beneficial when paired with the Hard Triplet Mining strategy that feeds the hardest triplets to the network.

Figure 4:
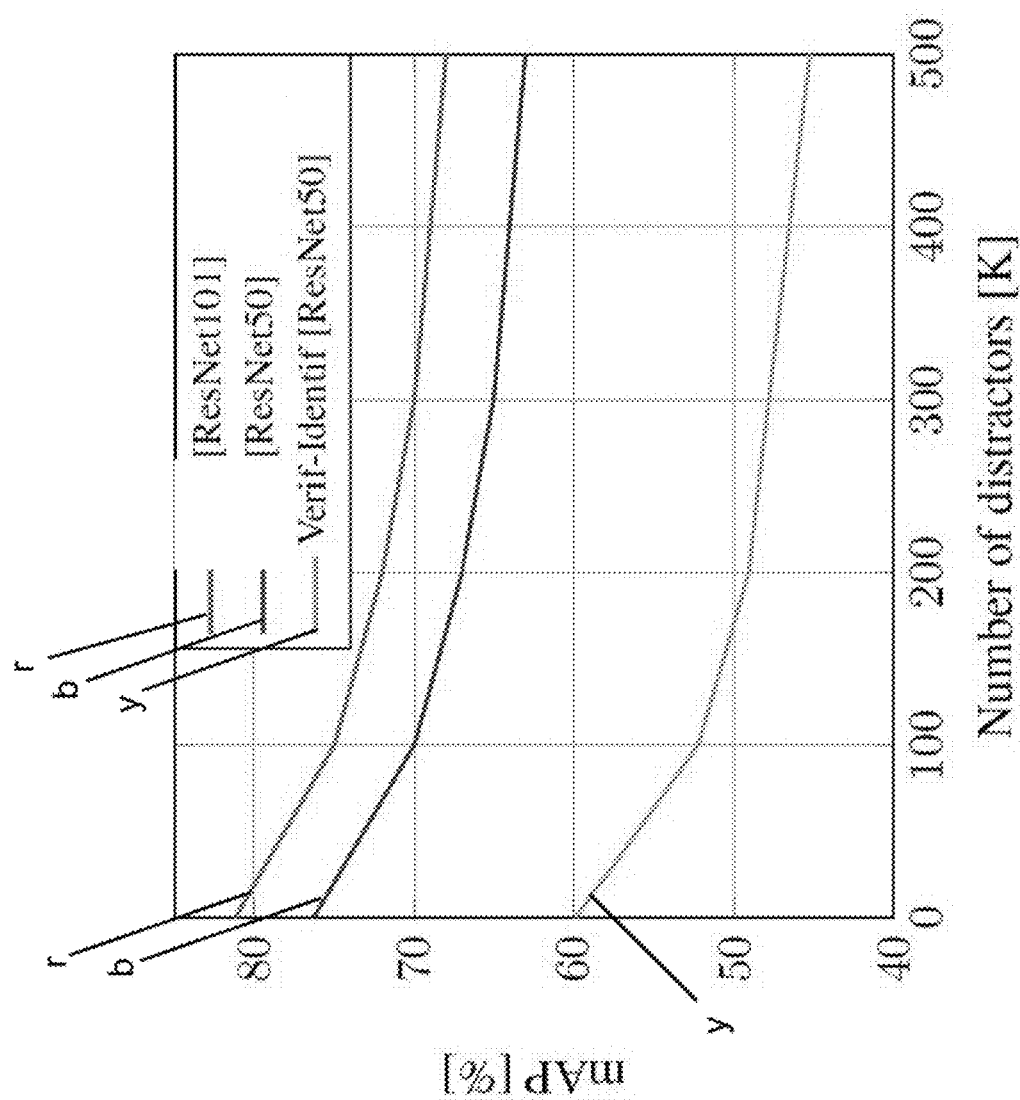

FIG. 4 illustrates a performance comparison (mAP) in the presence of a large number of distractors. As opposed to a target, which is the item searched, a distracter is an item that is not looked for, and which distracts from finding the target.

To test the robustness of the model, the model was evaluated in the presence of noise using Market+500K, an extension of the Market dataset that contains an additional set of 500K distractors.

To generate the distractors, ground-truth bounding boxes for persons in the images were collected. Then, the Intersection over Union between each predicted bounding box and ground-truth bounding box for a given image was calculated.

The Intersection over Union is an evaluation metric used to measure the accuracy of an object detector on a particular dataset.

A detection was labeled a distractor if its Intersection over Union with all ground-truth annotations was lower than 20%.

The training method was implemented with ResNet-50 (b) and ResNet-101 (r) based models, trained on Market, on this expanded dataset, while increasing the number of distractors from 0 to 500K.

The distractors were selected by randomly choosing the distractors from the distractor set and adding the selected distractors to the gallery set.

A comparison of the trained models with the previous state-of-the-art results reported for this expanded dataset. Both versions (r and b) of the trained model significantly outperform the state of the art (y), as presented in FIG. 4.

FIG. 5 illustrates that the ResNet-50-based method consistently outperforms all state-of-the-art methods by large margins on all 4 re-identification datasets and all metrics.

The ResNet-101-based method brings additional improvements across the board.

As described previously, combining Hard Triplet Mining with the other strategies mentioned above is effective for training of the image representation for re-identification.

Also, this approach outperforms recent works that propose complex models for multi-scale fusion, localized attention, or aligning images based on body parts using extra resources such as annotations or pre-trained detectors. The trained model is able to discriminate between body regions without such additional architectural modules.

As illustrated in FIG. 5, the last column of the table shows results for the Person Search dataset. This dataset differs from traditional re-identification datasets in that the different views of each person do not correspond to different cameras in a network. Nevertheless, the trained model performs well in this different scenario, achieving a large absolute improvement over the previous best-reported result (01M), illustrating the generality of the approach.

The training method also allows the obtaining of an embedding that captures invariance properties useful for re-identification.

To qualitatively analyze this invariance, Grad-Cam is used, a method for highlighting the discriminative regions that convolutional neural network-based models activate to predict visual concepts. This is done by using the gradients of these concepts flowing into the final convolutional layer.

For example, given two images, five dimensions are selected that contribute the most to the dot-product similarity between their representations. Then, for each image, the gradients of these five dimensions are individually propagated, and the activations in the last convolutional layer of the architecture of the training method are visualized.

It is noted each of these output dimensions are activated by fairly localized image regions and that the dimensions often reinforce one-another in that image pairs are often activated by the same region. It is noted that the similarity score is strongly influenced by localized image content. These localized regions tend to contain body regions that can inform on the type of clothing being worn. For example, image regions having the hem of a pair of shorts, the collar of a shirt, and the edge of a sleeve tend to contain body regions.

Therefore, rather than focusing on aligning human body joints, the model can make decisions based on attributes of clothing such as the length of a pair of pants or of a shirt's sleeves. This type of information can be leveraged for retrieval using the idea of "fashion landmarks."

Finally, we observe that some of the paired responses go beyond appearance similarity and respond to each other at a more abstract and semantic level.

Also, the model can qualitatively examine which parts of the images are highly influential, independently of the images with which they are matched. To do so, given an image and its embedding, the first fifty dimensions with the strongest activations are selected. The gradients of these dimensions are propagated and accumulated, again using Grad-Cam, and the activations in the last convolutional layer of the architecture of the training method are visualized.

As a result, visualization is obtained, which highlights parts of the images that, a priori, will have the most impact on the final results. This can be seen as a visualization of the implicit attention mechanism that is at play in the learned embedding.

It is noted that the model attends to regions known to drive attention in human vision, such as high-resolution text.

It is also noted that the model shows properties of contextual attention, particularly when image regions become occluded.

As such the person re-identification training method is relevant to fashion retrieval as it is essentially the problem of matching identities with the assumption that their clothing and general appearance is consistent.

The embodiments disclosed above may be implemented as a machine (or system), process (or method), or article of manufacture by using standard programming and/or engineering techniques to produce programming software, firmware, hardware, or any combination thereof. It will be appreciated that the flow diagrams described above are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiments. As such, the terms "article of manufacture" and "computer program product" as used herein are intended to encompass a computer program existent (permanently, temporarily, or transitorily) on any computer-usable medium such as on any memory device or in any transmitting device.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the embodiments as set forth in the claims.

Those skilled in the art will recognize that memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/ note exchanges, telephone/modem based network communication, hard-wired/cabled communication network, cellular communication, radio wave communication, satellite communication, and other wired or wireless network systems/communication links.

A method for training a convolutional neural network, for person re-identification, comprises pre-training a convolutional neural network to recognize individuals within a closed set of possible identifications; taking a plurality of triplet of images, where each triplet contains a query image, a positive image corresponding to an image of a same subject as in the query image, and a negative image corresponding to an image of a different subject as in the query image; computing the triplet loss for each of the triplets; ranking the triplets by the triplet loss computed; selecting a subset of triplets among the plurality of triplets, the subset of triplets having the largest computed loss among the plurality of triplets; and retraining the pre-trained convolutional neural network on each of the triplets of the subset of triplets to determine trained values of a plurality of parameters of the neural network.

The pre-training of the convolutional neural network to recognize individuals within a closed set of possible identifications may include pre-training the convolutional neural network with ImageNet.

The pre-training of the convolutional neural network to recognize individuals within a closed set of possible identifications may include training the convolutional neural network pre-trained with ImageNet using classification loss to realize person identification.

Random noise may be added to a region of each image of a triplet before training the pre-trained convolutional neural network on each of the triplets.

The size of the region receiving the random noise may be random.

The method training of the pre-trained convolutional neural network may include comparing the similarity between a query image in a triplet and the relevant image to the similarity between a query image in a triplet and a non-relevant image by computing loss of all triplets by at least a margin; and adjusting the current values of the parameters of the pre-trained convolutional neural network using the triplet loss.

The training of the pre-trained convolutional neural network may include degrading progressively the images of the triplet of the subset of triplets selected by adding random noise to a region of each image of a triplet; comparing the similarity between the degraded query image in a triplet and the relevant image to the similarity between the degraded query image in a triplet and a non-relevant image by computing loss of all triplets by at least a margin; and adjusting the current values of the parameters of the pre-trained convolutional neural network using the triplet loss.

The degrading of the random noise may be added to random sized regions.

The pre-trained convolutional neural network may be trained by processing triplets sequentially, allowing a different size input for each image.

The pre-trained convolutional neural network may be based on a Siamese neural network.

A method for training a convolutional neural network, for person re-identification, comprises pre-training of the convolutional neural network with ImageNet to recognize object categorizes contained within ImageNet; further pre-training the convolutional neural network using classification loss to realize person identification by recognizing individuals within a closed set of possible identifications; training the pre-trained convolutional neural network by sequentially processing a plurality of triplet of images and allowing a different size input for each image, each triplet containing a query image degraded by adding random noise to a region of the query image, a positive image corresponding to an image of a same subject as in the query image, and a negative image corresponding to an image of a different subject as in the query image; ranking the triplets by the triplet loss computed; selecting a subset of triplets among the plurality of triplets, the subset of triplets having the largest computed loss among the plurality of triplets; and retraining the pre-trained convolutional neural network on each of the triplets of the subset of triplets to determine trained values of a plurality of parameters of the neural network.

A size of the region receiving the random noise may be random.

A method for identification of a subject in an image from a set of images, comprises pre-training, by a data processor in a first server, a convolutional neural network with ImageNet to recognize individuals within a closed set of possible identifications and further pre-training the convolutional neural network using classification loss to realize person identification; training, by the data processor in the first server, the pre-trained convolutional neural network by sequentially processing a plurality of triplet of images and allowing a different size input for each image, each triplet containing a query image degraded by adding random noise to a region of the query image, a positive image corresponding to an image of a same subject as in the query image, and a negative image corresponding to an image of a different subject as in the query image by (a) ranking the triplets by the triplet loss computed (b) selecting a subset of triplets among the plurality of triplets, the subset of triplets having the largest computed loss among the plurality of triplets, and (c) retraining the pre-trained convolutional neural network on each of the triplets of the subset of triplets to determine trained values of a plurality of parameters of the neural network; and performing, by a data processor in a second server, re-identification of a subject of a reference image from a plurality of images using the trained convolutional neural network.

A size of the region receiving the random noise may be random.

A computer program product for training a convolutional neural network comprises code instructions, when the computer program product is executed on a computer, to execute a method for training a convolutional neural network from a base of training triplet images depicting subjects; the code instructions, when pre-training the convolutional neural network, pre-trains the convolutional neural network with ImageNet to recognize individuals within a closed set of possible identifications and further pre-trains the convolutional neural network using classification loss to realize person identification; the code instructions, when training the pre-trained convolutional neural network, trains the pre-trained convolutional neural network by sequentially processing a plurality of triplet of images and allowing a different size input for each image, each triplet containing a query image degraded by adding random noise to a region of the query image, a positive image corresponding to an image of a same subject as in the query image, and a negative image corresponding to an image of a different subject as in the query image by (a) ranking the triplets by the triplet loss computed (b) selecting a subset of triplets among the plurality of triplets, the subset of triplets having the largest computed loss among the plurality of triplets, and (c) retraining the pre-trained convolutional neural network on each of the triplets of the subset of triplets to determine trained values of a plurality of parameters of the neural network.

The code instructions may add random noise to a region having a random size.

A computer-readable medium, on which is stored a computer program product, comprises code instructions, when the computer program product is executed on a computer, to execute a method for training a convolutional neural network from a base of training triplet images depicting subjects; the code instructions, when pre-training the convolutional neural network, pre-trains the convolutional neural network with ImageNet to recognize individuals within a closed set of possible identifications and further pre-trains the convolutional neural network using classification loss to realize person identification; the code instructions, when training the pre-trained convolutional neural network, trains the pre-trained convolutional neural network by sequentially processing a plurality of triplet of images and allowing a different size input for each image, each triplet containing a query image degraded by adding random noise to a region of the query image, a positive image corresponding to an image of a same subject as in the query image, and a negative image corresponding to an image of a different subject as in the query image by (a) ranking the triplets by the triplet loss computed (b) selecting a subset of triplets among the plurality of triplets, the subset of triplets having the largest computed loss among the plurality of triplets, and (c) retraining the pre-trained convolutional neural network on each of the triplets of the subset of triplets to determine trained values of a plurality of parameters of the neural network.

The code instructions may adds random noise to a region having a random size.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for training a convolutional neural network, for person re-identification, comprising:
   pre-training a convolutional neural network to recognize individuals within a closed set of possible identifications;
   taking a plurality of triplet of images, where each triplet contains a query image, a positive image corresponding to an image of a same subject as in the query image, and a negative image corresponding to an image of a different subject as in the query image;
   computing the triplet loss for each of the triplets;
   ranking the triplets by the triplet loss computed;
   selecting a subset of triplets among the plurality of triplets, the subset of triplets having the largest computed loss among the plurality of triplets; and
   retraining the pre-trained convolutional neural network on each of the triplets of the subset of triplets to determine trained values of a plurality of parameters of the convolutional neural network.

2. The method as claimed in claim 1, wherein the pre-training of the convolutional neural network to recognize individuals within a closed set of possible identifications includes pre-training the convolutional neural network with ImageNet.

3. The method as claimed in claim 1, wherein random noise is added to a region of each image of a triplet before training the pre-trained convolutional neural network on each of the triplets.

4. The method according to claim 1, wherein the training of the pre-trained convolutional neural network comprises:
   comparing the similarity between a query image in a triplet and the relevant image to the similarity between a query image in a triplet and a non-relevant image by computing loss of all triplets by at least a margin; and
   adjusting the current values of the parameters of the pre-trained convolutional neural network using the triplet loss.

5. The method according to claim 1, wherein the pre-trained convolutional neural network is trained by processing triplets sequentially, allowing a different size input for each image.

6. The method according to claim 1, wherein the pre-trained convolutional neural network is based on a Siamese neural network.

7. The method as claimed in claim 2, wherein the pre-training of the convolutional neural network to recognize individuals within a closed set of possible identifications includes training the convolutional neural network pre-trained with ImageNet using classification loss to realize person identification.

8. The method as claimed in claim 3, wherein the size of the region receiving the random noise is random.

9. The method according to claim 4, wherein the training of the pre-trained convolutional neural network comprises:
   degrading progressively the images of the triplet of the subset of triplets selected by adding random noise to a region of each image of a triplet;
   comparing the similarity between the degraded query image in a triplet and the relevant image to the similarity between the degraded query image in a triplet and a non-relevant image by computing loss of all triplets by at least a margin; and
   adjusting the current values of the parameters of the pre-trained convolutional neural network using the triplet loss.

10. The method according to claim 9, wherein the degrading of the random noise is added to random sized regions.

11. A method for training a convolutional neural network, for person re-identification, comprising:
   pre-training of the convolutional neural network with ImageNet to recognize object categorizes contained within ImageNet;
   further pre-training the convolutional neural network using classification loss to realize person identification by recognizing individuals within a closed set of possible identifications;
   training the pre-trained convolutional neural network by sequentially processing a plurality of triplet of images and allowing a different size input for each image, each triplet containing a query image degraded by adding random noise to a region of the query image, a positive image corresponding to an image of a same subject as in the query image, and a negative image corresponding to an image of a different subject as in the query image;
   ranking the triplets by the triplet loss computed;

selecting a subset of triplets among the plurality of triplets, the subset of triplets having the largest computed loss among the plurality of triplets; and retraining the pre-trained convolutional neural network on each of the triplets of the subset of triplets to determine trained values of a plurality of parameters of the convolutional neural network.

12. The method as claimed in claim 11, wherein a size of the region receiving the random noise is random.

13. A method for identification of a subject in an image from a set of images, comprising:

pre-training, by a data processor in a first server, a convolutional neural network with ImageNet to recognize individuals within a closed set of possible identifications and further pre-training the convolutional neural network using classification loss to realize person identification;

training, by the data processor in the first server, the pre-trained convolutional neural network by sequentially processing a plurality of triplet of images and allowing a different size input for each image, each triplet containing a query image degraded by adding random noise to a region of the query image, a positive image corresponding to an image of a same subject as in the query image, and a negative image corresponding to an image of a different subject as in the query image by (a) ranking the triplets by the triplet loss computed (b) selecting a subset of triplets among the plurality of triplets, the subset of triplets having the largest computed loss among the plurality of triplets, and (c) retraining the pre-trained convolutional neural network on each of the triplets of the subset of triplets to determine trained values of a plurality of parameters of the neural network; and performing, by a data processor in a second server, re-identification of a subject of a reference image from a plurality of images using the trained convolutional neural network.

14. The method as claimed in claim 13, wherein a size of the region receiving the random noise is random.

15. A computer program product non-transitorily existent on a computer-usable medium for training a convolutional neural network comprising:

code instructions, when the computer program product is executed on a computer, to execute a method for training a convolutional neural network from a base of training triplet images depicting subjects;

said code instructions, when pre-training the convolutional neural network, pre-trains the convolutional neural network with ImageNet to recognize individuals within a closed set of possible identifications and further pre-trains the convolutional neural network using classification loss to realize person identification;

said code instructions, when training the pre-trained convolutional neural network, trains the pre-trained convolutional neural network by sequentially processing a plurality of triplet of images and allowing a different size input for each image, each triplet containing a query image degraded by adding random noise to a region of the query image, a positive image corresponding to an image of a same subject as in the query image, and a negative image corresponding to an image of a different subject as in the query image by (a) ranking the triplets by the triplet loss computed (b) selecting a subset of triplets among the plurality of triplets, the subset of triplets having the largest computed loss among the plurality of triplets, and (c) retraining the pre-trained convolutional neural network on each of the triplets of the subset of triplets to determine trained values of a plurality of parameters of the convolutional neural network.

16. The computer program product as claimed in claim 15, wherein said code instructions adds random noise to a region having a random size.

17. A non-transitory computer usable medium, on which is stored a computer program product, comprising:

code instructions, when the computer program product is executed on a computer, to execute a method for training a convolutional neural network from a base of training triplet images depicting subjects;

said code instructions, when pre-training the convolutional neural network, pre-trains the convolutional neural network with ImageNet to recognize individuals within a closed set of possible identifications and further pre-trains the convolutional neural network using classification loss to realize person identification;

said code instructions, when training the pre-trained convolutional neural network, trains the pre-trained convolutional neural network by sequentially processing a plurality of triplet of images and allowing a different size input for each image, each triplet containing a query image degraded by adding random noise to a region of the query image, a positive image corresponding to an image of a same subject as in the query image, and a negative image corresponding to an image of a different subject as in the query image by (a) ranking the triplets by the triplet loss computed (b) selecting a subset of triplets among the plurality of triplets, the subset of triplets having the largest computed loss among the plurality of triplets, and (c) retraining the pre-trained convolutional neural network on each of the triplets of the subset of triplets to determine trained values of a plurality of parameters of the convolutional neural network.

18. The non-transitory computer usable medium as claimed in claim 17, wherein said code instructions adds random noise to a region having a random size.

* * * * *